US006577777B1

(12) United States Patent
Yoshino et al.

(10) Patent No.: US 6,577,777 B1
(45) Date of Patent: Jun. 10, 2003

(54) IMAGE PROCESSING USING ADJOINING RELATIONSHIPS BETWEEN IMAGE PARTS

(75) Inventors: Kimitoshi Yoshino, Kyoto (JP); Koji Hatada, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 09/572,484

(22) Filed: May 16, 2000

Related U.S. Application Data

(63) Continuation of application No. 08/727,141, filed on Oct. 8, 1996, now Pat. No. 6,141,462.

(30) Foreign Application Priority Data

Oct. 11, 1995 (JP) ............................................ 9-290324
Oct. 11, 1995 (JP) ............................................ 7-290325

(51) Int. Cl.[7] ................................................ G06K 9/00
(52) U.S. Cl. ....................................... 382/284; 345/629
(58) Field of Search ................................ 382/284, 203, 382/204, 205, 199, 282; 345/435, 434, 431, 629, 630, 631, 619, 634; 707/527; 358/450, 453

(56) References Cited

U.S. PATENT DOCUMENTS

| | | | | |
|---|---|---|---|---|
| 4,395,700 A | | 7/1983 | McCubbrey et al. | 382/205 |
| 4,718,090 A | * | 1/1988 | Copper, Jr. | 382/26 |
| 4,845,765 A | | 7/1989 | Juvin | 382/226 |
| 5,119,439 A | | 6/1992 | Osawa et al. | 382/205 |
| 5,204,918 A | | 4/1993 | Hirosawa | 382/41 |
| 5,220,647 A | | 6/1993 | Kumagai | 382/242 |
| 5,295,236 A | * | 3/1994 | Bjorge et al. | 395/134 |
| 5,313,570 A | | 5/1994 | Dermer et al. | 395/131 |
| 5,386,483 A | | 1/1995 | Shibazaki | 382/205 |
| 5,459,818 A | * | 10/1995 | Grant et al. | 395/114 |
| 5,542,052 A | * | 7/1996 | Deutsch et al. | 395/131 |
| 5,666,213 A | | 9/1997 | Ohshita et al. | 382/199 |
| 5,668,893 A | | 9/1997 | Kanda et al. | 382/205 |
| 5,812,691 A | * | 9/1998 | Udupa et al. | 382/128 |

FOREIGN PATENT DOCUMENTS

| | | |
|---|---|---|
| EP | 0216158 | 8/1986 |
| EP | 0261447 | 8/1987 |
| WO | 93/12501 | 6/1993 |

OTHER PUBLICATIONS

Hall, E.L., et al., *Computer Society Conference on Pattern Recognition and Image Processing*, "Object Location in Computed Tomography Images Using Global Local Segmentation," Chicago, Aug. 6–8, 1979, pp. 344–352.

* cited by examiner

*Primary Examiner*—Yon J. Couso
(74) *Attorney, Agent, or Firm*—Ostrolenk, Faber, Gerb & Soffen, LLP

(57) ABSTRACT

The present invention carries out a desired image processing while using adjoining relationship between image parts. When each pair of image parts among a plurality of consecutive image parts drawn in a predefined drawing order have a difference in density value that is smaller than a threshold value and are located adjacent to one another, the consecutive image parts are recognized to constitute one combined image part. A desired image processing, such as trapping process, is carried out for the combined image part.

60 Claims, 12 Drawing Sheets

CPU
22
24
ROM
26
I/O
34
KEYBOARD
36
38
RAM
28
BLEND RECOGNIZING MEANS
54
BIT MAP DRAWING MEANS
50
TRAPPING MEANS
56
ADJOINING RELATIONSHIP EXTRACTING MEANS
52
DISPLAY CONTROL UNIT
42
CRT
44
BIT MAP MEMORY
30
I/O
46
DISK
48

PostScript FILE

DATA LIST
OBJECTS
P1
P2
P3
P4
P5
P6
P7

PROCESS OF EXTRACTING ADJOINING RELATIONSHIPS BETWEEN
PLURALITY OF IMAGE PARTS
ADJOINING RELATIONSHIP LIST
1 | 2
2 | 1, 3, 7
3 | 2, 4, 7
4 | 3, 5, 7
5 | 4, 6, 7
6 | 5, 7
7 | 2, 3, 4, 5, 6

BLEND RECOGNIZING PROCESS

DATA LIST
BLEND FIGURE (FLAG ADDITION)
OBJECT
P1
P6
P7

TRAPPING PROCESS

PostScript FILE

PARTS
P1
C=10%
P2
C=12%
P3
C=14%
P4
C=16%
P5
C=18%
P6
C=20%
P7
Y= 20%

TOTAL IMAGE
P1
P2
P3
P4
P5
P6
P7

BLEND RECOGNIZING PROCESS
EXECUTE
(EMBODIMENT)
NOT EXECUTE
(CONVENTIONAL TECHNIQUE)

TP
(P1~P6)
P7

ADJOINING RELATIONSHIP LIST OF IMAGE PARTS

| 1 | 2, 3, 4 |
|---|---|
| 2 | 1, 3 |
| 3 | 1, 2 |
| 4 | 1 |

IMAGE PARTS

DETERMINE WHETHER CIRCUMSCRIBED RECTANGLES OVERLAP EACH OTHER

DETERMINE WHETHER CONTOUR VECTORS CROSS EACH OTHER

IMAGE PROCESSING USING ADJOINING RELATIONSHIPS BETWEEN IMAGE PARTS

RELATED APPLICATION

This is a continuation of application Ser. No. 08/727,141, filed Oct. 8, 1996 now U.S. Pat. No. 6,141,462.

BACKGROUND OF THE INVENTION

1. Field of the Invention

The present invention relates to a method of and an apparatus for determining adjoining relationships between a plurality of image parts. The present invention also relates to a method of and an apparatus for processing image data which include parts data representing a plurality of image parts that are drawn in a predefined drawing order while determining adjoining relationships between the plurality of image parts.

2. Description of the Related Art

In the field of prepress processing, one image generally consists of a plurality of image parts. When two image parts are located adjacent to each other, an overlapping area (also referred to as 'trapping area' or an 'overlaying area') is formed on a boundary between the adjoining image parts, in order to prevent a dropout from being observed on the boundary.

In order to generate a trapping area, it is required first to determine which pair of image parts among the plurality of image parts adjoin to each other. The expression 'image parts adjoining to each other' means that the image parts are in close contact with each other without any clearance on at least part of the boundary between the image parts, or they overlap each other at least partially.

FIGS. 13A–13C show a known method of determining adjoining relationships between a plurality of image parts. In the conventional process of determining an adjoining relationship between two image parts shown in FIG. 13A, it is first determined whether the circumscribed rectangles of the respective image parts shown by the broken lines in FIG. 13B overlap each other. When the circumscribed rectangles overlap each other, the two image parts may adjoin to each other. It is then determined whether vectors representing the contours of the respective image parts cross each other as shown in FIG. 13C. When the contour vectors cross each other or partially overlap each other, the two image parts are determined to adjoin to each other. It is here assumed that one general image consists of N image parts and that the contour of each image part consists of 'n' vectors. The processing time required for determining the overlapping relationships between the respective pairs of circumscribed rectangles of the N image parts is in proportion to the number N of the image parts. The processing time required for determining whether the contour vectors of the two image parts cross each other is in proportion to the second power of the number 'n' of the contour vectors. Namely the total processing time required for extracting all the possible combinations of two image parts from the N image parts and determining whether the contour vectors cross each other for all the possible combinations is expected to be substantially in proportion to $n^2 \times N^2$.

In the conventional method discussed above, as the number N of the image parts or the number n of the vectors constituting the contour vector of each image part increases, the required processing time remarkably increases in proportion to the second power of the increased number. An extremely long time is required for the processing especially when the number N of image parts is as large as tens or hundreds of thousands.

Incidentally, in DTP (desktop publishing) applications using a computer system, a group of consecutive figures having a fixed rate of density variation sometimes creates an image area having a substantially continuous gradation in density. This group of consecutive figures is generally referred to as a 'blend', 'blend figure' or 'color step'. Although each figure included in the blend figure represents one individual figure, the group of figures is drawn to generate an image area having a substantially continuous change in density.

In some cases, it is necessary to form a trapping area on a boundary between a blend figure and another image part. Image data (for example, a page description language such as PostScript (trademark of Adobe Corporation)), however, do not include information indicating that the image part is part of the blend figure. In the conventional method, the trapping process is accordingly carried out between each image part included in the blend figure and another image part not included in the blend figure. This undesirably increases the processing time required for creating a trapping area. This problem is not characteristic of the trapping process but is found in a variety of image processing operations with respect to the blend figure.

SUMMARY OF THE INVENTION

An object of the present invention is thus to provide an improved technique which alleviate the increase in required processing time even when the number of image parts increases remarkably.

Another object of the present invention is thus to provide an improved technique which carries out a desired image processing without processing the respective image parts included in a blend figure separately.

The above objects are at least partially attained by a method of determining adjoining relationships between a plurality of image parts according to the present invention. The method comprises the steps of: (a) generating bit map images by allocating different pixel values to the plurality of image parts, and filling the inside of the contour of each the image part with the allocated pixel value; and (b) examining pixel values of neighboring pixels in the bit map images, and recognizing adjoining relationship between image parts including the neighboring pixels when the neighboring pixels have different pixel values.

According to the above method, only the processing time for bit-mapping increases as the number of image parts increases. Therefore the increase of the overall processing time is much smaller than that of the conventional method even when the number of image parts increases remarkably.

In a preferred embodiment, the pixel values are drawing orders of the plurality of image parts. In another embodiment, the method further comprises the step of: specifying resolution of the bit map images before the step (a); and wherein the generating in the step (a) generates the bit map images with the resolution.

According to an aspect of the preset invention, the step (a) comprises the step of successively writing the bit map images into one bit map memory in a drawing order of the plurality of image parts; and the step (b) comprises the step of examining pixel values of neighboring pixels in the bit map images written in the bit map memory.

According to another aspect of the present invention, the method comprises the steps of: (a) recognizing consecutive image parts in the drawing order in the plurality of image parts to constitute one combined image part when each pair of image parts among the consecutive image parts adjoins to each other and a difference in density between the pair is smaller than a predetermined threshold value; and (b) carrying out a specific image processing for the combined image part.

This method enables a desired image processing to be carried out without separately processing the respective image parts which have been formed to constitute one combined image part.

In a preferred embodiment, the step (b) comprises the steps of: creating a trapping area, in which a density value of the combined image part being combined with a density value of another image part adjoining to the combined image part, on a boundary between the combined image part and the another image part; and generating a trapping area part by determining a density value of the trapping area based on a relationship between density values of the consecutive image parts constituting the combined image part and the density value of the another image part.

In another embodiment, the step (a) comprises the steps of: (1) generating bit map images by allocating different pixel values to the plurality of image parts and by filling the inside of a contour of each the image part with the allocated pixel value, and writing the bit map images in a bit map memory; (2) examining whether neighboring pixels in the bit map images have different pixel values or not; and (3) recognizing adjoining relationship between image parts including the neighboring pixels when the neighboring pixels have different pixel values.

This method enables a trapping area to be created on the boundary between the combined image part and another image part with a relatively short processing time.

The present invention is also directed to an apparatus for determining adjoining relationships between a plurality of image parts. The apparatus comprises: bit-mapping means for generating bit map images by allocating different pixel values to the plurality of image parts, and filling the inside of the contour of each the image part with the allocated pixel value; and recognizing means for examining pixel values of neighboring pixels in the bit map images, and recognizing adjoining relationship between image parts including the neighboring pixels when the neighboring pixels have different pixel values.

According to an aspect of the present invention, the apparatus comprises: recognizing means for recognizing consecutive image parts in the drawing order in the plurality of image parts to constitute one combined image part when each pair of image parts among the consecutive image parts adjoins to each other and a difference in density between the pair is smaller than a predetermined threshold value; and processing means for carrying out a specific image processing for the combined image part.

The present invention is further directed to a computer readable medium having computer readable program code means embodied therein for determining adjoining relationships between a plurality of image parts. The computer program code means comprises: computer program code means for causing a computer to generate bit map images by allocating different pixel values to the plurality of image parts, and to fill the inside of the contour of each the image part with the allocated pixel value; and computer program code means for causing the computer to examine pixel values of neighboring pixels in the bit map images, and to recognize adjoining relationship between image parts including the neighboring pixels when the neighboring pixels have different pixel values.

According to another aspect of the present invention, the computer program code means comprises: computer program code means for causing a computer to recognize consecutive image parts in the drawing order in the plurality of image parts to constitute one combined image part when each pair of image parts among the consecutive image parts adjoins to each other and a difference in density between the pair is smaller than a predetermined threshold value; and computer program code means for causing the computer to carry out a specific image processing for the combined image part.

These and other objects, features, aspects, and advantages of the present invention will become more apparent from the following detailed description of the preferred embodiments with the accompanying drawings.

BRIEF DESCRIPTION OF THE DRAWINGS

FIGS. 7A through 7D show a concrete procedure of the adjoining relationship extracting process;

DESCRIPTION OF THE PREFERRED EMBODIMENT

A. Structure and Operation of Embodiment

Figure 1:
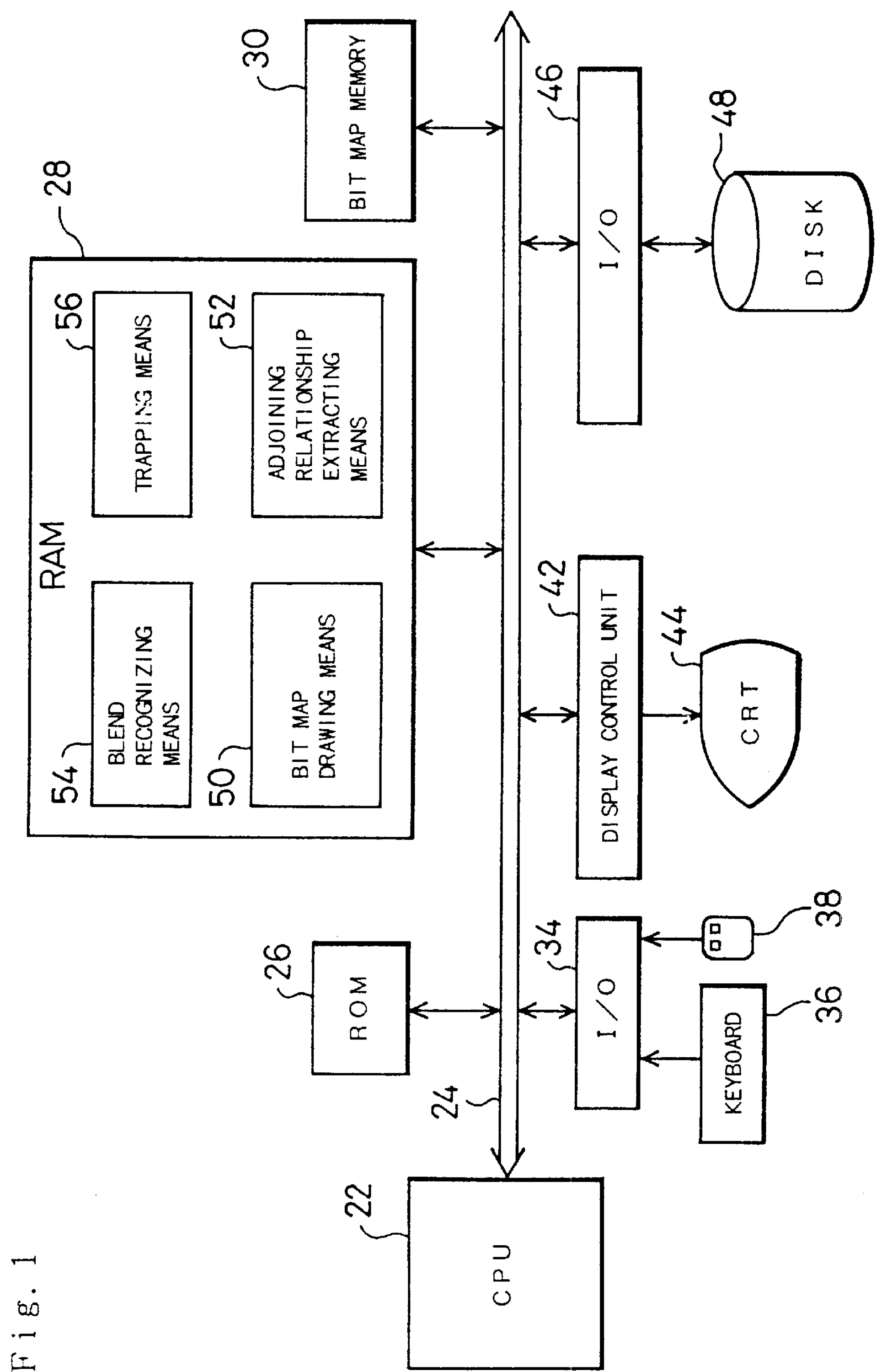
FIG. 1 is a block diagram illustrating the structure of an image processing apparatus for processing images embodying the present invention.

One preferable mode for embodying the present invention is described below. FIG. 1 is a block diagram illustrating the structure of an image processing apparatus for processing images, to which one embodiment of the present invention is applied. The image processing apparatus includes a CPU 22, a bus 24, a ROM 26 and a RAM 28 working as main memories, a bit map memory 30, a first I/O interface 34, a display control unit 42, and a second I/O interface 46. A keyboard 36 and a mouse 38 functioning as input means are connected to the first I/O interface 34. A color CRT 44 working as display means connects with the display control unit 42. A magnetic disk 48 working as an external storage device is connected to the second I/O interface 46.

RAM 28 stores computer program codes for implementing the functions of bit map drawing means 50, adjoining relationship extracting means 52, blend recognizing means 54, and trapping means 56. In other words, the CPU 22 executes the computer program codes to implement the functions of the respective means. Details of the functions of these means will be described later.

The computer program codes (or applications programs) for realizing the functions of the respective means are transmitted from a portable storage medium (carriable storage medium), such as floppy disks or CD-ROMs, to the RAM 28 or the magnetic disk 48, and stored in the RAM 28 when being executed.

Figures 2A, 2B, 2C, 2D, 2E, 2F:
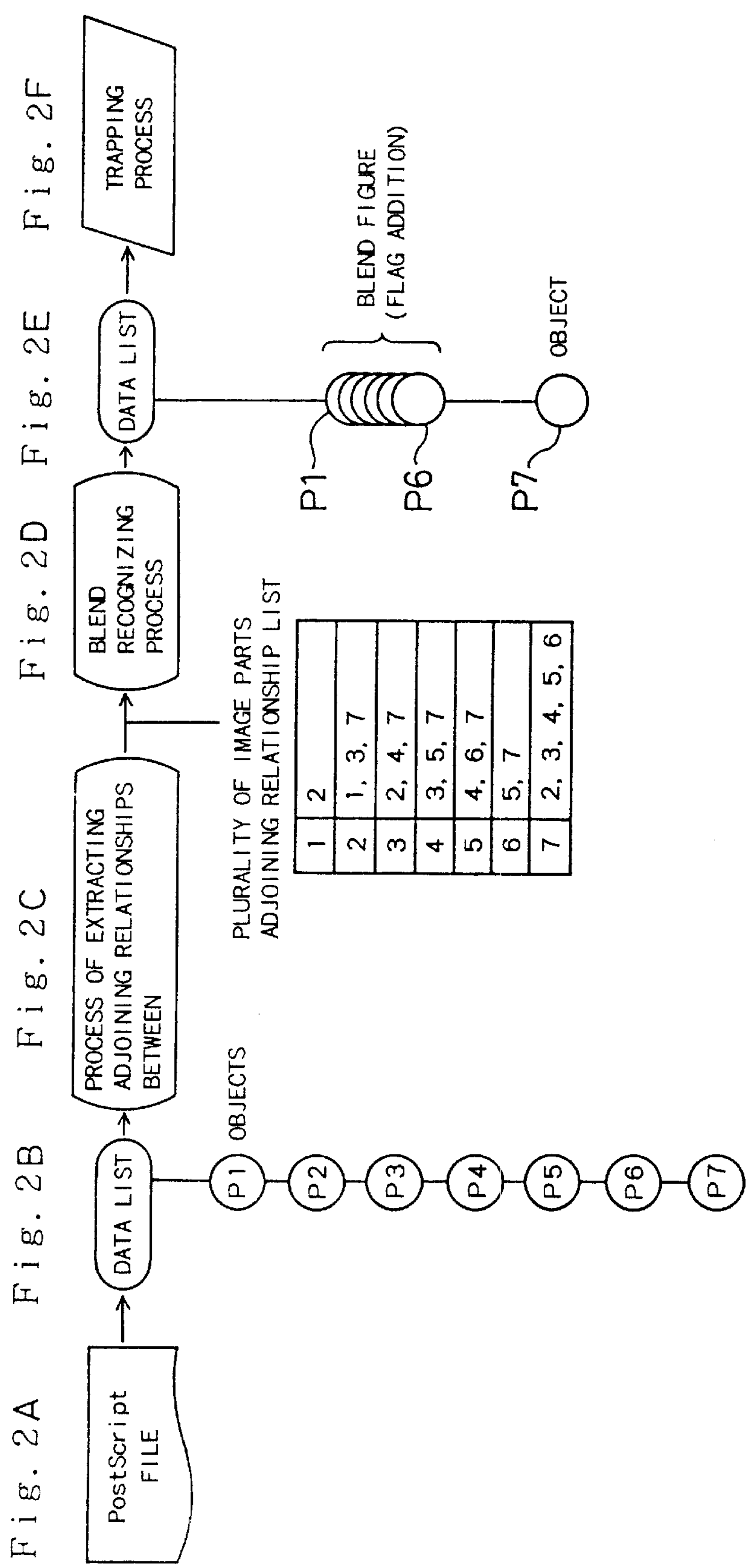
FIGS. 2A through 2F show general processing steps of the embodiment.
Figures 3A, 3B, 3C, 3D, 3E, 3F:
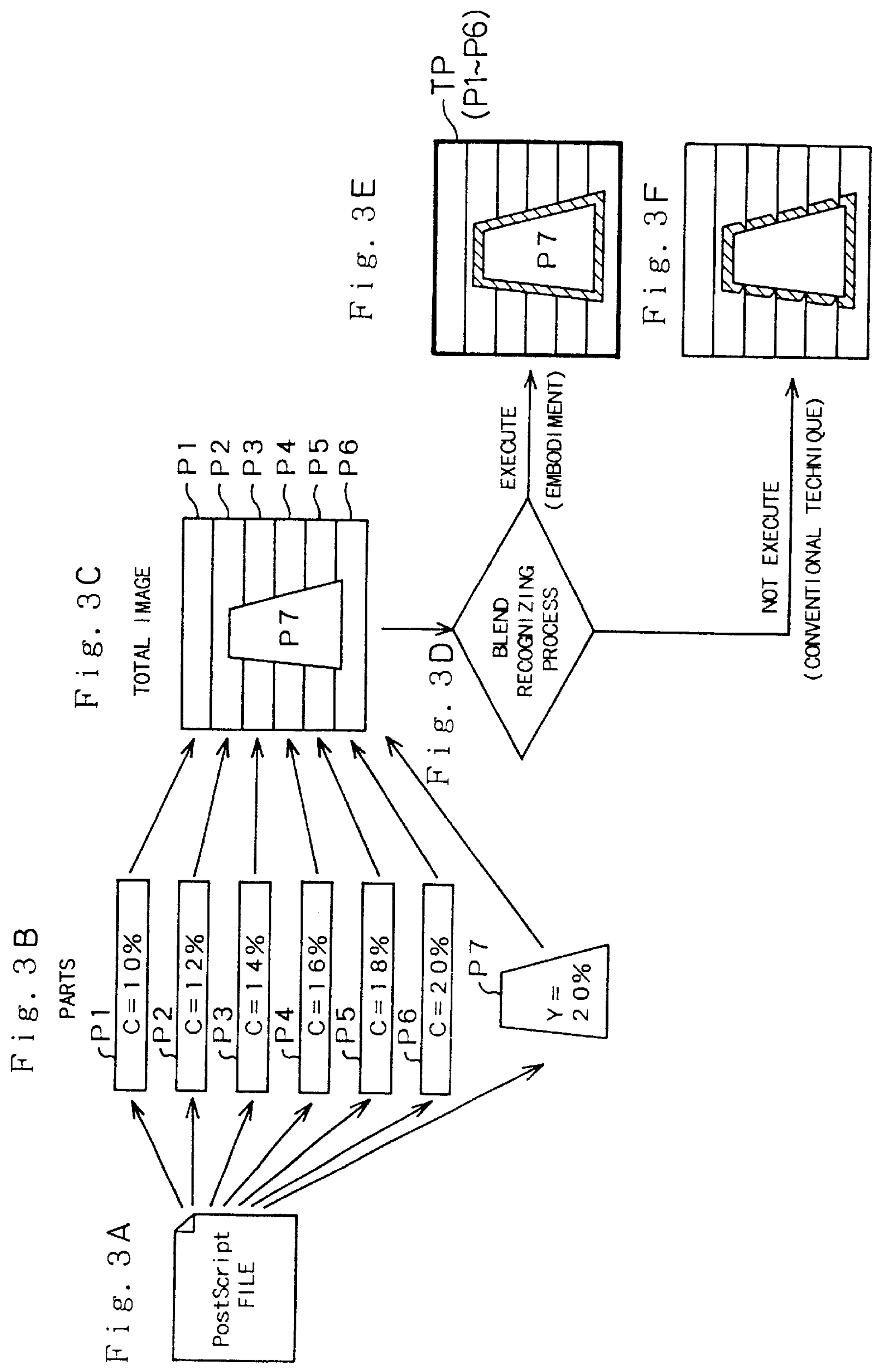
FIGS. 3A through 3F show a concrete procedure of the processing executed in the embodiment.

FIG. 2 shows general processing steps of the embodiment, and FIG. 3 shows a concrete procedure of the processing executed in the embodiment. In this embodiment, image data are in form of a PostScript file as shown in FIGS. 2A and 3A. Parts data of seven image parts P1 through P7 are included in a data list of the PostScript file as shown in FIGS. 2B and 3B. Each image part is also referred to as an 'object'. Referring to FIG. 3B, in the first through the sixth image parts P1 to P6, the density of the C (cyan) separation ranges from 10% to 20%, whereas the densities of the other color separations of Y (yellow), M (magenta), and K (black) are all equal to 0%. The seventh image part P7 has the density of 20% in the Y separation and the density of 0% in the other color separations of M, C, and K.

FIG. 3C shows a total image obtained by drawing the seven image parts P1 through P7. The densities of the six image parts P1 to P6 are varied by a common difference of 2% as shown in FIG. 3B. These six image parts P1 to P6 successively adjoin to one another as shown in FIG. 3C. This means that the six image parts P1 to P6 are formed to constitute a blend figure. Note that the data file of the PostScript file does not include information showing that the six image parts P1 to P6 constitute a blend figure.

At the step of FIG. 2C, the bit map drawing means 50 and the adjoining relationship extracting means 52 execute a process of extracting image parts adjoining to each other and creates an adjoining relationship list of the image parts. The expression 'image parts adjoining to each other' means that the image parts are in close contact with each other without any clearance on at least part of the boundary between the image parts, or they overlap each other at least partially. In the example of FIG. 3C, the first image part P1 adjoins only to the second image part P2. The seventh image part P7 adjoins to the second through the sixth image parts P2 to P6. The adjoining relationship list shown in FIG. 2C indicates adjoining relationships between these image parts. The numerals in the left column of the adjoining relationship list represent the drawing order of the image parts, whereas the numerals in the right column show the drawing order of the image parts which adjoin to the image part defined by the numeral in the left column. Details of the process of extracting adjoining relationships will be described later.

At the step of FIG. 2D, the blend recognizing means 54 carries out a blend recognizing process to recognize that the six image parts P1 through P6 constitute a blend figure.

Figure 4:
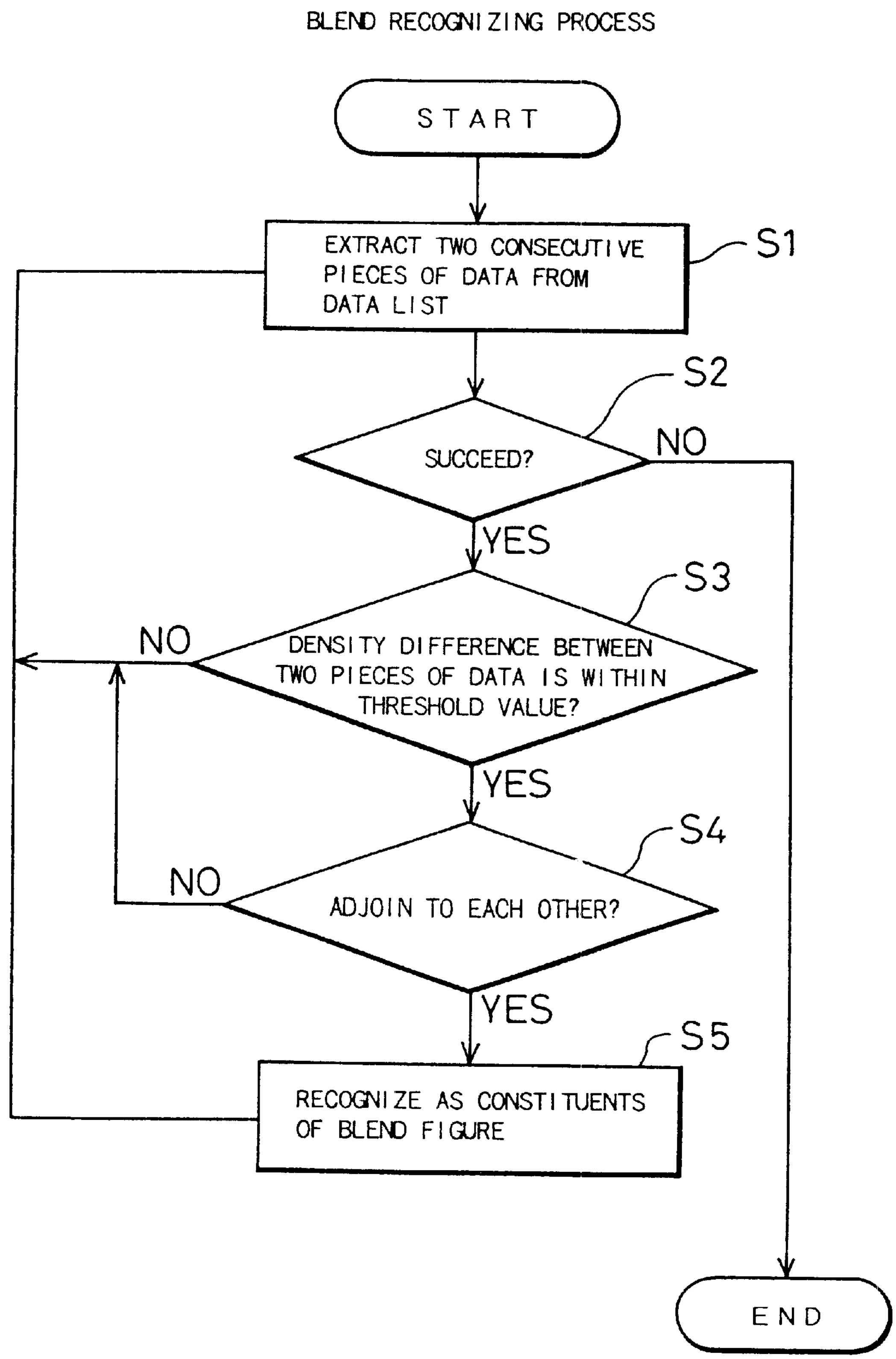
FIG. 4 is a flowchart showing a blend recognizing process routine.

FIG. 4 is a flowchart showing a blend recognizing process routine. When the program enters the routine, the blend recognizing means 54 (FIG. 1) extracts two consecutive pieces of parts data from the data list at step S1. When it is determined that two pieces of parts data have been extracted successfully at step S2, the program proceeds to step S3, at which the blend recognizing means 54 calculates a difference in density between the image parts expressed by the two pieces of parts data and subsequently determines whether the difference is equal to or less than a predetermined threshold value Th. A value of approximately 3% is, for example, preferable for the threshold value Th. The first two image parts P1 and P2 shown in FIG. 3B have the density difference of 2%, which is smaller than the threshold value Th (=3%). The difference in density is calculated for all the color components Y, M, C, and K. The decision step S3 gives an affirmative answer when the density differences of the color components ΔY, ΔM, ΔC, and ΔK are all equal to or less than the threshold value Th. Different threshold values Th may be set for the respective color components.

When the density differences of the respective color components ΔY, ΔM, ΔC, and ΔK are all equal to or less than the threshold value Th, the program proceeds to step S4 in the flowchart of FIG. 4, at which it is determined whether the two image parts adjoin to each other or not. The determination whether the two image parts adjoin to each other is carried out by referring to the adjoining relationship list (FIG. 2C) obtained in the process of extracting adjoining relationships between the plurality of image parts. For example, the adjoining relationship between the first two image parts P1 and P2 is registered in the adjoining relationship list, and the decision point S4 accordingly gives an affirmative answer.

When the affirmative answer is given both at steps S3 and S4, that is, when the difference in density between the two image parts is not greater than the threshold value Th and the two image parts adjoin each other, it is determined that these two image parts constitute a blend figure (step S5).

After the processing of step S5, the program returns to step S1, at which the blend recognizing means 54 updates the parts data by one piece. By way of example, after the processing of steps S1 through S5 has been completed for the first two image parts P1 and P2, another piece of parts data representing the third image part P3 is extracted instead of the parts data representing the first image part P1 at the next cycle of step S1. The processing of step S2 and subsequent steps is then executed for the second and the third image parts P2 and P3. When the processing of steps S1 through S5 in the flowchart of FIG. 4 has been completed for all the possible combinations of the two consecutive image parts, it is recognized that the first six image parts P1 through P6 constitute one blend figure as shown in FIG. 2E and that the seventh image part P7 is an independent image part. A flag showing that the image part is a constituent of a blend figure is added to each parts data of the image parts P1–P6, which are recognized as part of the blend figure. The flag may be replaced by any other type of information as long as it indicates that the image part is a constituent of the blend figure.

In the process of recognizing a blend figure, the expression 'a plurality of consecutive image parts adjoining to one another' does not require that an arbitrary pair among the plurality of image parts adjoins to each other but implies that two consecutive image parts adjoin to each other. In this sense, the six consecutive image parts P1 through P6 shown in FIG. 3C adjoin to one another.

After the recognition of a blend figure, the trapping means 56 carries out a trapping process of the image (FIG. 2F). As discussed below, the blend figure is processed virtually as one image part in the trapping process. The blend figure is thus hereinafter referred to as either 'combined image part' or 'virtual image part'.

Figure 5A:
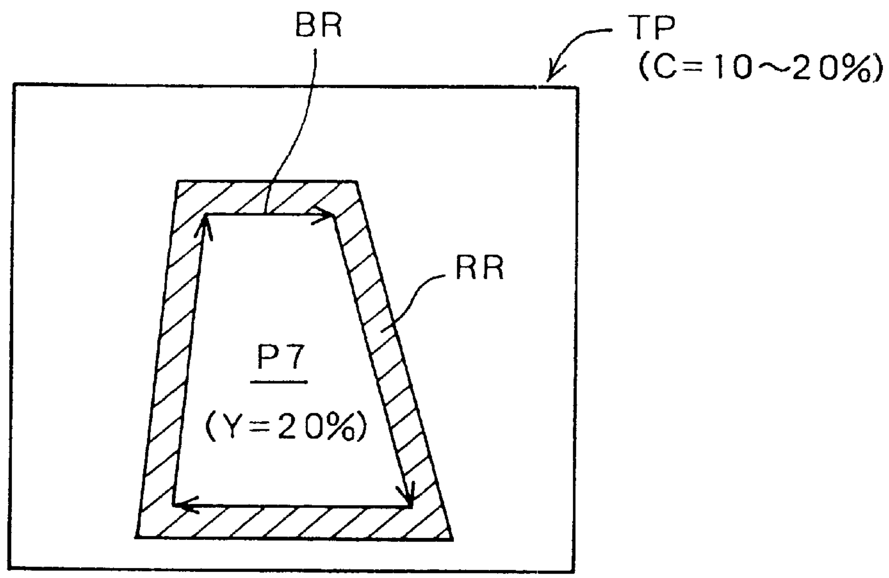
FIGS. 5A and 5B show a concrete procedure of the trapping process.

FIG. 5 shows a concrete procedure of the trapping process with respect to the combined image part and another image part. In the trapping process, it is first determined whether the combined image part TP of the blend figure shown in FIG. 5A adjoins to another image part P7. When the adjoining relationship list (FIG. 2C) indicates that the image part P7 adjoins to at least one of the image parts P1 through P6 constituting the combined image part TP, it is determined that the image part P7 and the combined image part TP adjoin to each other.

In case that the two image parts P7 and TP adjoin each other, the trapping process is carried out to generate a trapping area RR in the vicinity of a boundary BR between these two image parts P7 and TP (FIG. 5A). The trapping process generally determines the configuration and density of the trapping area in the manner that one image part having a lighter color among the two image parts expands into the area of the other image part having a darker color.

In the trapping process of this embodiment, it is assumed that the intensities of the color components increase in the order of Y<M<C<K. (Note that the density values are independent of the intensities of the color components.) The densities of the respective color components Y, M, C, and K are examined for the two image parts P7 and TP which are the target of the trapping process. The area of one image part having a non-zero density of the lowest intensity color component is expanded into the area of the other image part. In this example, the densities of the image part P7 are Y=20% and M=C=K=0%, whereas those of the combined image part TP are C=10% to 20% and Y=M=K=0%. Since the Y component in which the image part P7 has a non-zero density has the lowest intensity, the trapping area RR is formed to extend from the border BR between the two image parts P7 and TP to the outside of the image part P7 (in other words, formed inside the combined image part TP) as shown in FIG. 5A. The trapping area RR can be produced by expanding the contour of the image part P7.

Figure 5B:
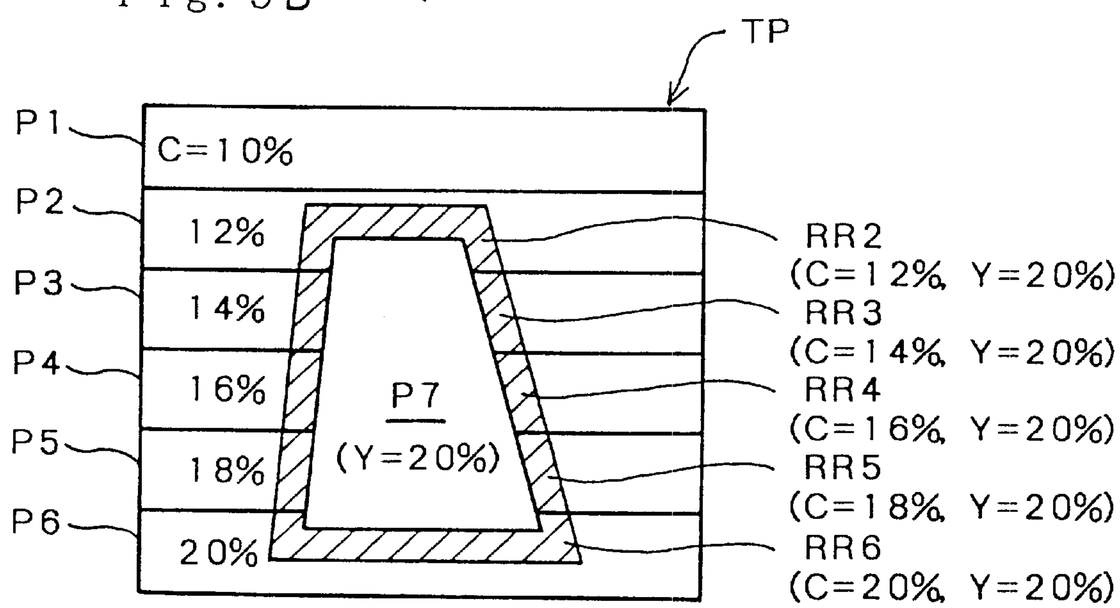

After determining the configuration of the trapping area RR, the trapping means 56 determines the densities of the respective color components in the trapping area RR as shown in FIG. 5B. The non-zero densities of the respective color components of the original image part TP originally existing on the location of the trapping area RR are kept unchanged in the trapping area RR, whereas the density of the color component of the lowest intensity in the other image part is newly adopted in the trapping area RR. In the example of FIG. 5B, the trapping area RR consequently includes five areas RR2 through RR6 having different densities. The area RR2 has the densities of C=12% and Y=20% obtained by combining the non-zero density of the original image part P2 (C=12%) with the non-zero density of the image part P7 (Y=20%). The area RR3 has the densities of C=14% and Y=20% obtained by combining the non-zero density of the original image part P3 (C=14%) with the non-zero density of the image part P7 (Y=20%). The other areas RR4 through RR6 also have the densities obtained in this manner.

The trapping area RR created in the above manner is handled as one independent image part, and the parts data of the trapping area RR are added to the data list.

Generally in the trapping process, the configuration of the trapping area is obtained by executing expansion or contraction of one of the two target image parts. The density values of the trapping area are then determined according to the density values of the two target image parts. There are a variety of known methods for realizing the trapping process other than that discussed above. The variety of methods are also applicable to the trapping process in the present invention.

FIG. 3E shows the result of the trapping process obtained by carrying out the blend recognizing process of the embodiment as discussed above. FIG. 3F shows the result without the blend recognizing process. In the latter case without the blend recognizing process, the trapping process is carried out between each of the image parts P1 through P6 constituting the blend figure and the seventh image part P7. The contour of the resulting trapping area may accordingly have undesired unevenness as shown in FIG. 3F. In the former case with the blend recognizing process, on the other hand, the plurality of image parts constituting the blend figure are recognized as one combined image part, so that the resulting trapping area has the smooth contour. In the case with the blend recognizing process, the configuration of the trapping area can be obtained by only one step of contour expansion or contraction. The required processing time is thus significantly shorter than that in the case without the blend recognizing process.

Figure 6:
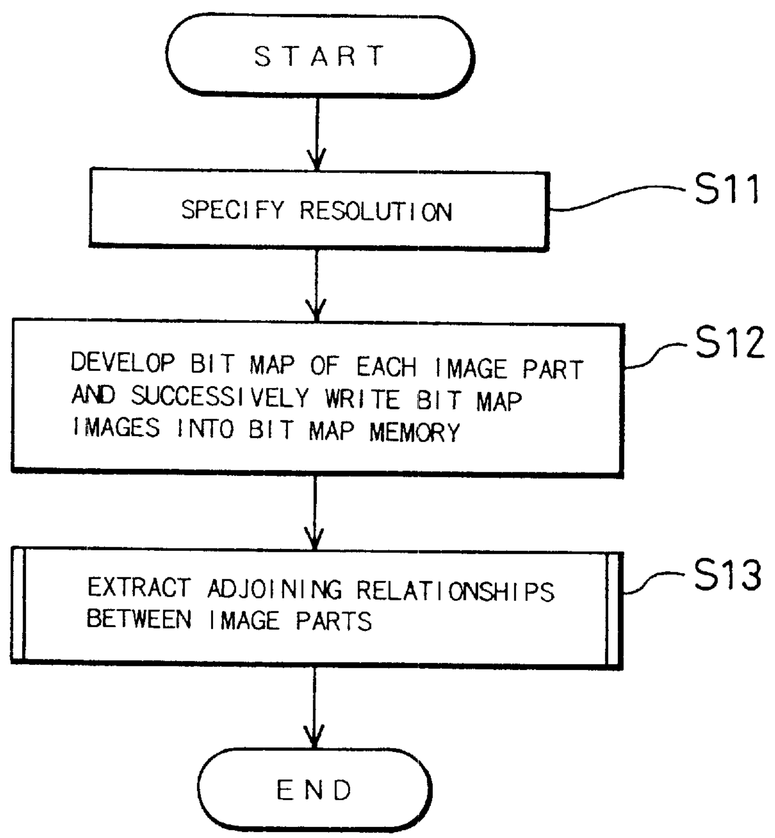
FIG. 6 is a flowchart showing a routine of extracting adjoining relationships between a plurality of image parts.
Figures 7B, 7D:
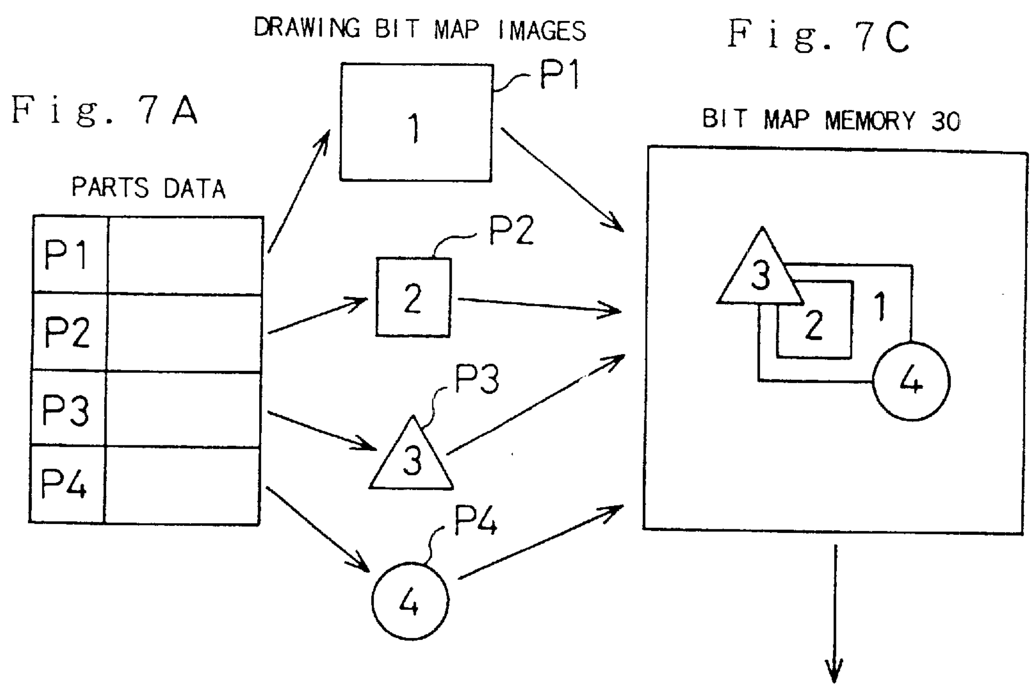

B. Process of Extracting Adjoining Relationships Between Plurality of Image Parts FIG. 6 is a flowchart showing a routine of extracting adjoining relationships between a plurality of image parts, and FIGS. 7A–7D show a concrete procedure of the adjoining relationship extracting process. For the matter of convenience, in this example, it is assumed that a total image consists of four image parts P1 through P4 as shown in FIG. 7A.

Parts data of each image part includes contour data representing the contour of each image part and an order of drawing, according to which each image part is to be drawn. A variety of data formats may be applicable to the parts data, such as PostScript. When the page description language is used for the parts data of the respective image parts, the order of arranging the parts data directly corresponds to the order of drawing.

Referring to the flowchart of FIG. 6, at step S11, the operator specifies the resolution of bit map images, which is used in the process of bit-mapping each image part, with the keyboard 36 or the mouse 38. The 'resolution of bit map images' represents the width of one pixel in each bit map image. In this embodiment, it is assumed that the resolution is set equal to 0.2 mm.

The program then proceeds to step S12, at which the bit map drawing means 50 (FIG. 1) develops bit-map images of the respective image parts and successively writes the resulting bit map images into the bit map memory 30. FIGS. 7B and 7C show the details of the bit map drawing process. In accordance with a concrete example, the bit map drawing means 50 generates bit map images (FIG. 7B) by allocating different characteristic pixel values to the respective image parts P1 to P4 and filling the inside of the contour of each image part with the allocated characteristic pixel value, and successively writes the resulting bit map images into the bit map memory 30 in a predetermined drawing order. In this embodiment, numerals 1 to 4 representing the drawing order are respectively allocated as the pixel values of the image parts P1 to P4. The total image of FIG. 7C thus obtained is hereinafter referred to as the 'total bit map image' or simply as the 'bit map image'.

Figure 8:
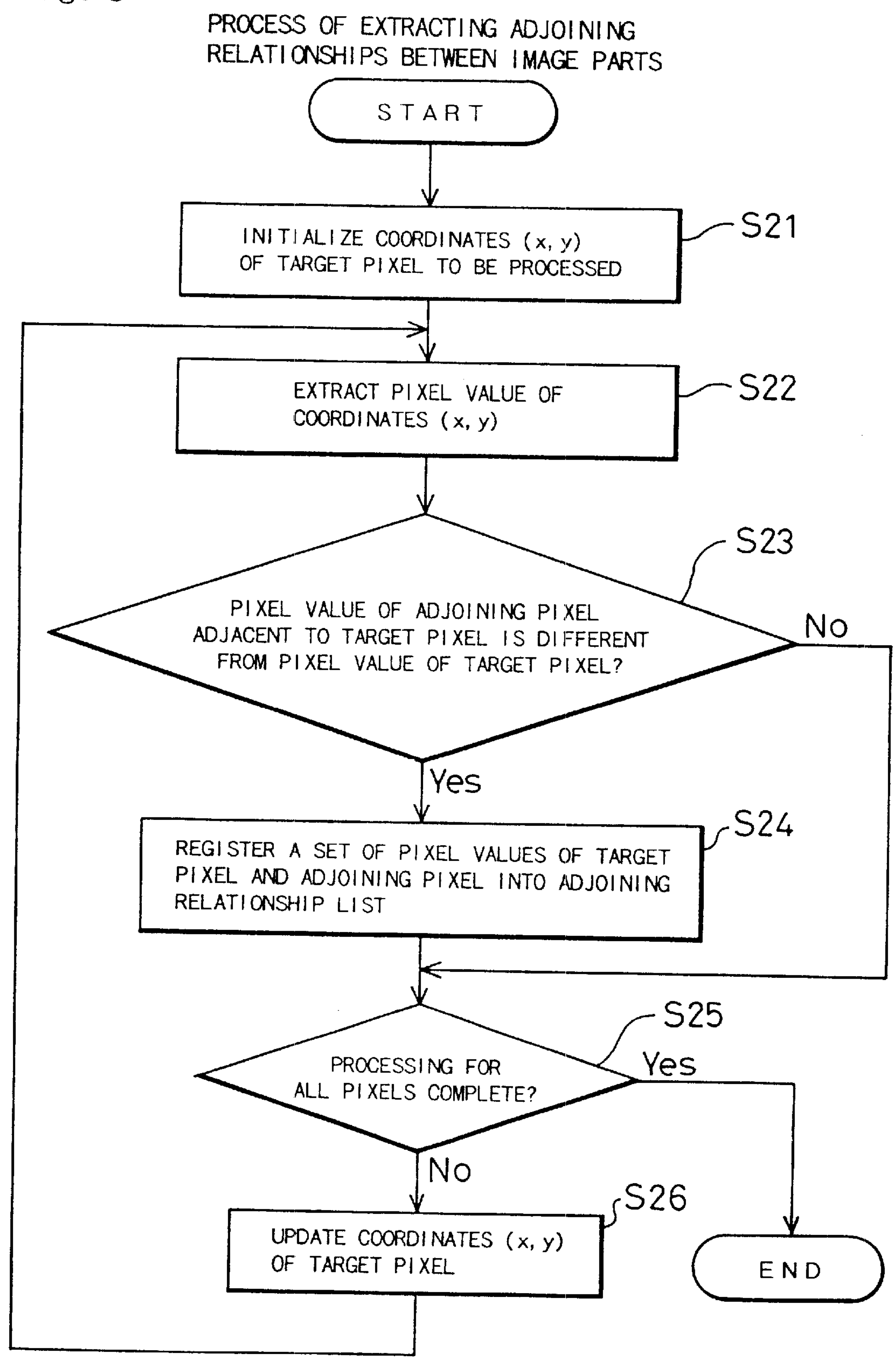
FIG. 8 is a flowchart showing details of the processing executed at step S13 in the flowchart of FIG. 6.

Referring back to the flowchart of FIG. 6, at step S13, the adjoining relationship extracting means 52 extracts adjoining relationships between the plurality of image parts and creates an adjoining relationship list of the image parts shown in FIG. 7D. FIG. 8 is a flowchart showing the details of the processing executed at step S13 in the flowchart of FIG. 6.

Coordinates (x,y) of a target pixel to be processed are initialized to (0,0) at step S21, and the pixel value of the coordinates (x,y) (that is, the pixel value of the target pixel) is read from the bit map memory 30 at step S22. The coordinates 'x' and 'y' respectively correspond to addresses in the horizontal direction and in the vertical direction in the bit map memory 30.

The program then proceeds to step S23, at which it is determined whether the pixel value of an adjoining pixel adjacent to the target pixel is different from the pixel value of the target pixel.

Figure 9A:
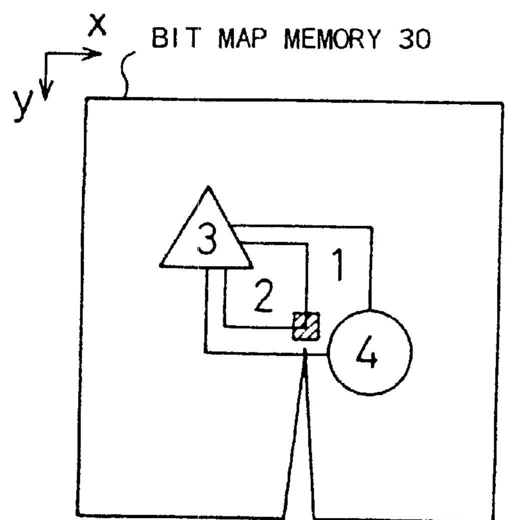
FIGS. 9A and 9B show a concrete procedure of the processing executed at step S23.
Figure 9B:
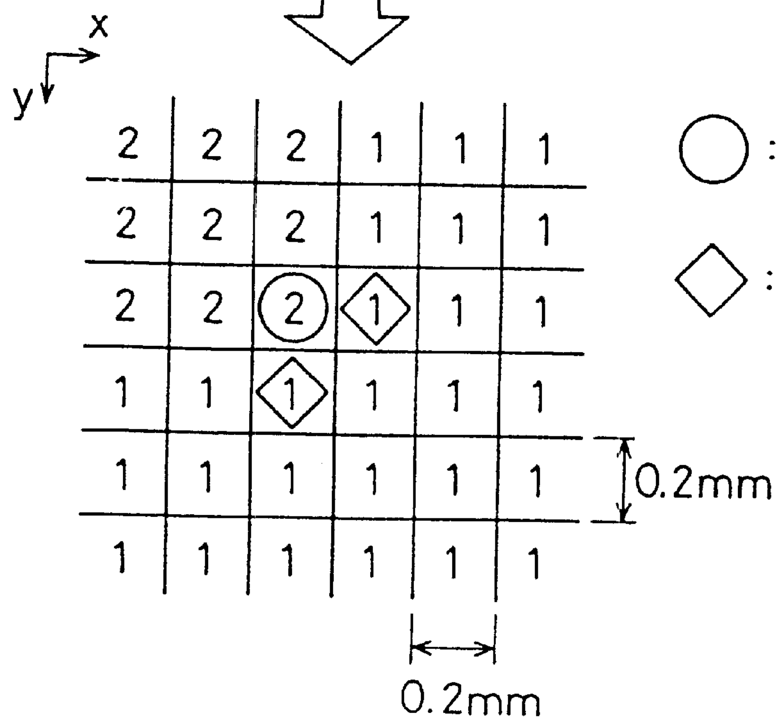

FIGS. 9A and 9B show a concrete example of the processing executed at step S23. FIG. 9B is an enlarged view showing part of the total bit map image shown in FIG. 9A. Each square block in FIG. 9B corresponds to one pixel, and the number in each pixel block represents the pixel number allocated to each pixel. In the drawing of FIG. 9B, the pixel value of the target pixel is enclosed with a circle, whereas the pixel values of the adjoining pixels are enclosed with rhombuses. In this embodiment, the adjoining pixels whose pixel values are checked at step S23 are pixels having the coordinates (x+1,y) and (x,y+1). Namely the adjoining pixels checked at step S23 are pixels located on the right hand side of and immediately below the target pixel. The coordinates (x,y) of the target pixel are varied over the whole coordinate range of the total bit map image. This procedure enables the pixel value of each pixel to be compared with the pixel values of the adjoining pixels located immediately above and below and on the right hand side and left hand side of the pixel.

When some pixel value of the adjoining pixels is different from the pixel value of the target pixel, the program proceeds to step S24 in the flowchart of FIG. 8, at which the set of pixel values of the target pixel and the adjoining pixel are registered into the adjoining relationship list. Referring to FIG. 7D, the pixel values of the adjoining pixels adjacent to each pixel are registered in the adjoining relationship list. In the example of FIG. 9B, since the pixel value '2' of the target pixel is different from the pixel value '1' of the adjoining pixel, the value '1' is registered as the pixel value adjoining to the pixel value '2' is registered whereas the value '2' is registered as the pixel value adjoining to the pixel value '1' in the adjoining relationship list of the image parts.

Referring back to the flowchart of FIG. 8, at step S25, it is determined whether the processing has been completed for all the pixels included in the total bit map image. When the processing has not yet been completed, the program proceeds to step S26 at which the coordinates (x,y) of the target pixel are updated and then returns to step S22. The repeated execution of steps S22 through S26 completes the adjoining relationship list of the image parts with respect to the total bit map image.

As discussed above, in this embodiment, the pixel values allocated to the respective image parts P1 to P4 in the bit map image are identical with the numerals representing the drawing order of the image parts P1 to P4. This feature enables the adjoining relationships between the respective image parts to be determined based on the adjoining relationship list of the image parts (see FIG. 7D) and the parts data of the respective image parts which includes the drawing order.

As long as different pixel values are allocated to fill the inside of the contours of the respective image parts (that is, as long as respective pixel values are uniquely related to the respective image parts), the allocated pixel values may be other values which are different from the drawing order of the image parts. In the event that the bit map image is generated with pixel values which are not the drawing order, it would be required to store information which represents the relationship between the respective image parts and the pixel values allocated to the bit map images of the respective image parts.

Figure 10:
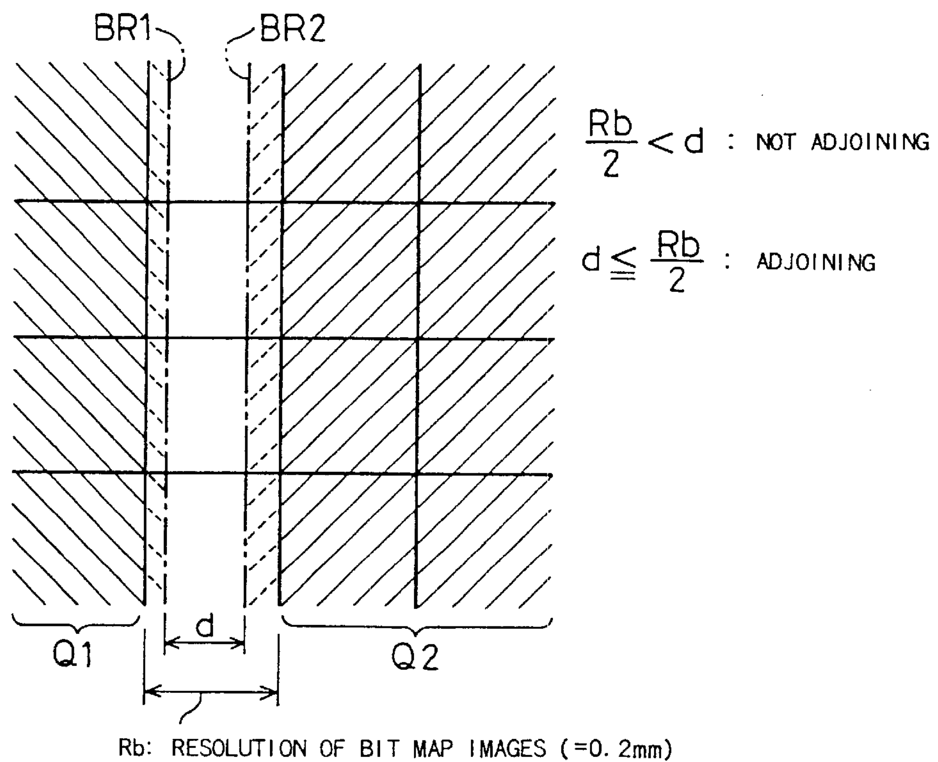
FIG. 10 shows the resolution of adjoining relationships.

FIG. 10 shows the resolution of adjoining relationships in this embodiment. The 'resolution of adjoining relationships' represents the distance between the image parts for which an adjoining relationship is affirmed. In the drawing of FIG. 10, each square block defined by the solid lines corresponds to one pixel. The one-dot chain line shows a true boundary BR1 of a first image part Q1, and the two-dot chain line a true boundary BR2 of a second image part Q2. The areas specified as Q1 and Q2, which are filled with slanted lines, represent the areas of the first image part and the second image part in the respective bit map images. The boundary between the bit map images of these image parts is set on the boundary of the pixels having a specified resolution (or pixel width) Rb.

When a distance 'd' between the true boundaries BR1 and BR2 of the two image parts Q1 and Q2 is greater than half the resolution Rb of bit map images as in the example of FIG. 10, there is a one-pixel clearance between the two image parts in their bit map images. It is accordingly determined that the two image parts do not adjoin to each other. When the distance 'd' between the true boundaries BR2 and BR2 is equal to or less than half the resolution Rb of bit map images, the one-bit clearance does not exist between the two image parts in their bit map images and it is accordingly determined that the two image parts adjoin to each other. This means that a resolution Rn of adjoining relationships is half the resolution Rb of bit map images.

Since the resolution Rn of adjoining relationships is half the resolution Rb of bit map images, the operator can set the resolution Rb of bit map images according to a desired resolution Rn of adjoining relationships. By way of example, in case that a relatively low resolution Rn of adjoining relationships is allowable (that is, when the resolution Rn can be a relatively large value), a relatively large value (for example, 0.3 mm) is set for the resolution Rb of bit map images. This effectively shortens the processing time required for bit-mapping. In case that a relatively high resolution Rn of adjoining relationships is desirable (that is, when the resolution Rn should be a relatively small value), a relatively small value (for example, 0.1 mm) is set for the resolution Rb of bit map images.

Figure 11A:
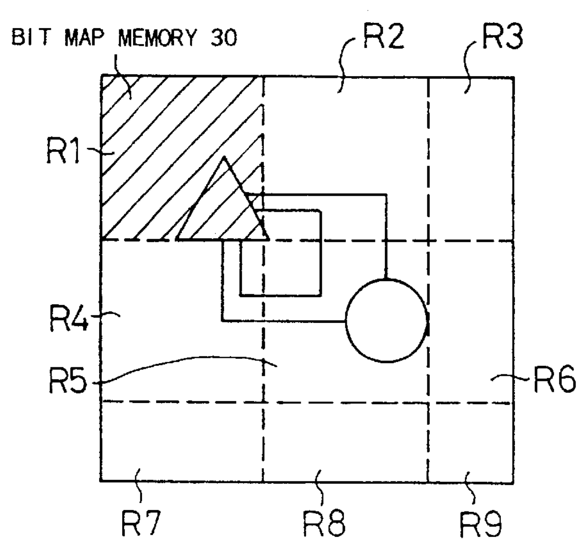
FIGS. 11*a* and 11*b* show a method of dividing a total image into a plurality of areas and bit-mapping the respective divisional areas one by one in the bit map memory 30.

There are some cases in which the total bit map image can not be written concurrently into the bit map memory 30 because of the resolution of bit map images or the size of the total image. In such cases, the total image is divided into a plurality of areas R1 through R9 as shown in FIG. 11*a*. The divisional areas are bit-mapped in the bit map memory 30 one by one and then subjected to the adjoining relationship extracting process shown in the flowchart of FIG. 8.

Figure 11B:
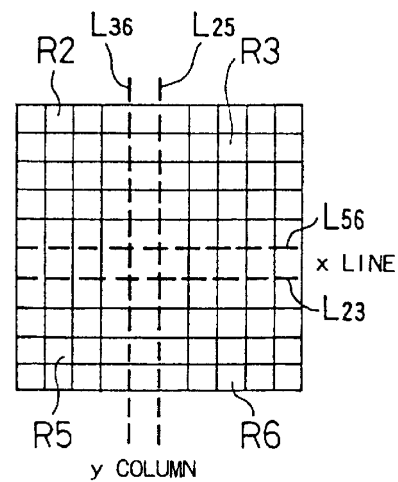

When part of the boundary of the division coincides with adjoining portions of image parts, the simple division of the total image may cause unsuccessful detection of the adjoining relationship between the image parts having the adjoining portions. The division should accordingly be carried out in the manner that divisional areas adjacent to each other have an overlapping area of at least one pixel-width therebetween. FIG. 11*b* is an enlarged view showing the vicinity of the boundaries of the divisional areas R2, R3, R5, and R6. Each lattice in the drawing represents one pixel. The divisional area R2 has boundaries defined by the broken lines L25 and L23; the divisional area R3 has boundaries defined by the broken lines L36 and L23; the divisional area R5 has the boundaries defined by the broken lines L25 and L56; and the divisional area R6 has the boundaries defined by the broken lines L36 and L56. In this manner, the pixels on the line 'x' or the column 'y' are included in at least two divisional areas adjoining to each other.

Division of the total image by setting an overlapping area of at least one pixel-width enables the adjoining image parts to be extracted without failure.

In the above embodiment, the total bit map image is generated by filling the inside of the contour of each image part with a specific pixel value and successively writing the resulting bit map images into one bit map memory 30. The adjoining image parts are then extracted by comparing the pixel values of the adjoining pixels with each other in the total bit map image. This method only increases the time required for bit-mapping each image part with an increase in number of image parts. The increase in processing time required for the determination of adjoining relationships is thereby restricted to a significantly lower level than that of the conventional technique, which extracts the adjoining relationships based on the existence of intersection of the contour vectors corresponding to the respective image parts.

The preferred embodiment of the present invention may be modified, for example, as follows:

(1) In the process of extracting the adjoining image parts, instead of the pixel values of the adjoining pixels which are horizontally or vertically adjoining to the target pixel as shown in FIG. 9, the pixel values of the adjoining pixels which are diagonally, horizontally, or vertically adjoining to the target pixel may be compared with the pixel value of the target pixel. In other words, the pixel values of the eight-neighbor pixels of each target pixel can be examined instead of the pixel values of the four-neighbor pixels of the target pixel.

Figure 12:
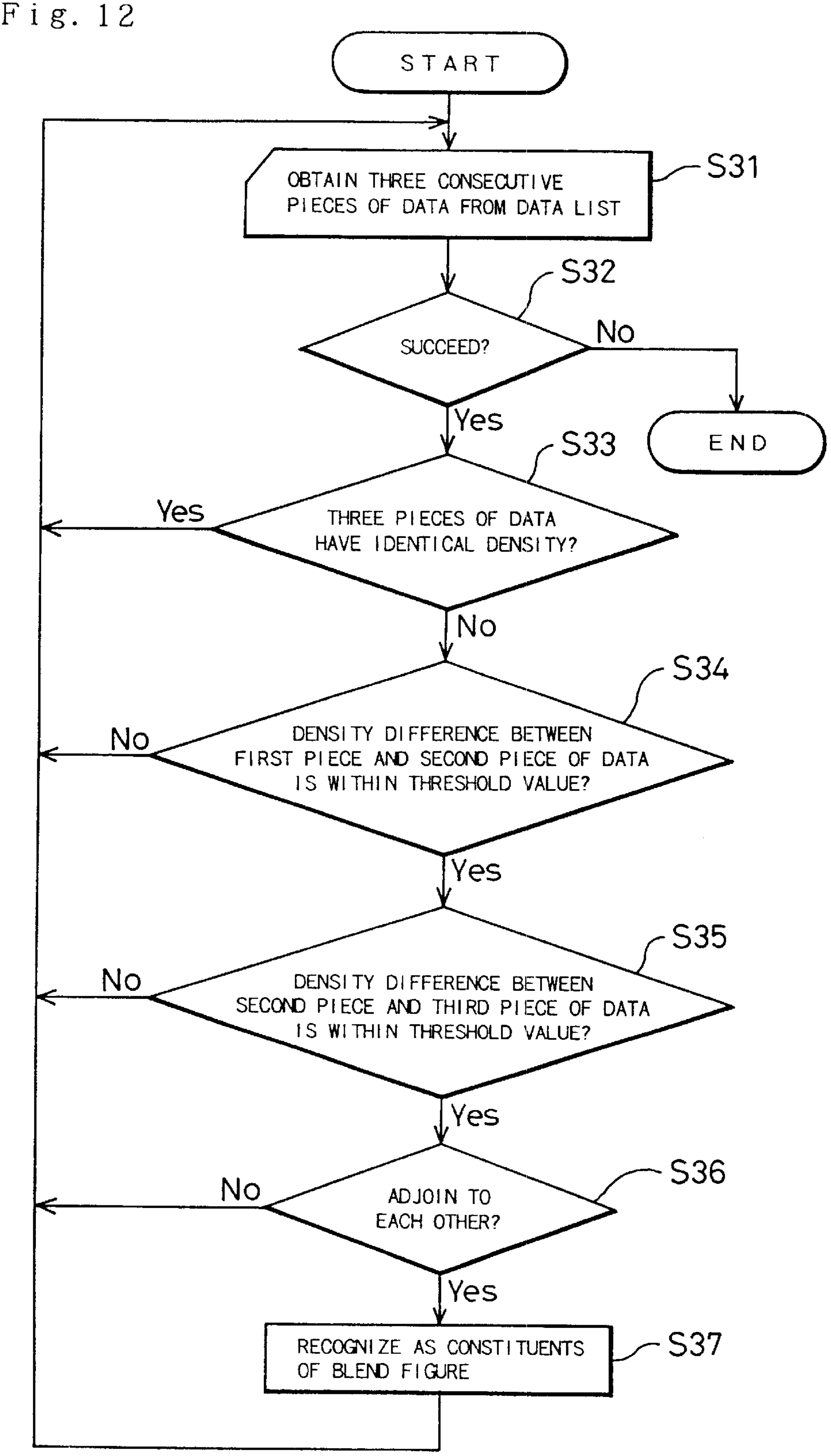
FIG. 12 is a flowchart showing another blend recognizing process routine.
Figure 13A:
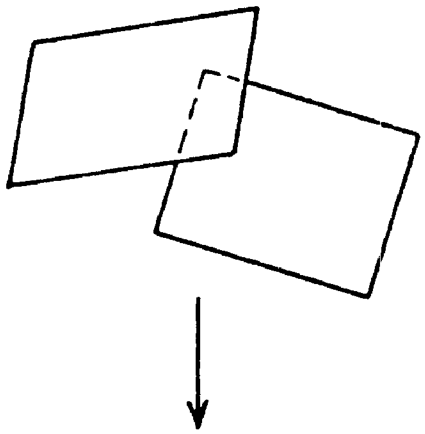
FIGS. 13A through 13C show a conventional method of determining adjoining relationships between a plurality of image parts.
Figure 13B:
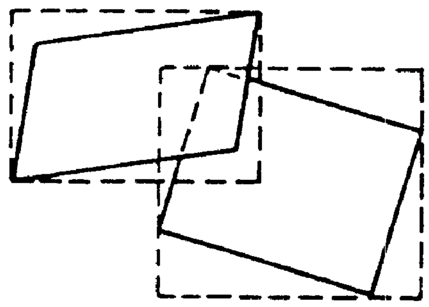
Figure 13C:
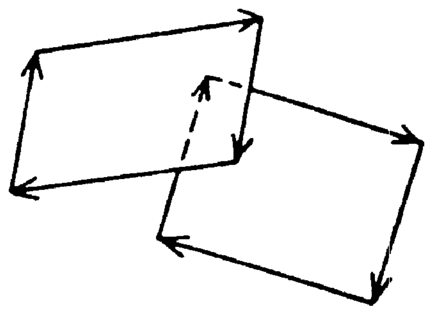

(2) The blend recognizing process routine shown in FIG. 4 may be replaced by another blend recognizing process routine shown in the flowchart of FIG. 12. The latter blend recognizing process routine includes the additional steps to enable a plurality of consecutive image parts, such as characters, which are different from the actual blend figure and have an identical density, not to be recognized as the constituents of the blend figure. In the actual blend figure, however, two consecutive image parts may have an identical density when the number of tone variation steps is great enough. In this processing routine, when three or more image parts have an identical density, these image parts are excluded from the target of recognition as the blend figure.

The concrete processing steps are described according to the blend recognizing process routine of FIG. 12. When the program enters the routine, the blend recognizing means 54 extracts three consecutive pieces of parts data from the data list at step S31. When it is determined that three pieces of parts data have been extracted successfully at step S32, the program proceeds to step S33, at which the blend recognizing means 54 determines whether the three pieces of parts data have an identical density. When at least one piece of parts data among the three pieces has a density different from those of the other pieces of parts data, the program proceeds to step S34. It is determined at step S34 whether the difference in density between the first and the second pieces of parts data is equal to or less than a predetermined threshold value Th. When the density difference is not greater than the predetermined threshold value Th, the program proceeds to step S35, at which it is determined whether the difference in density between the second and the third pieces of parts data is equal to or less than the predetermined threshold value Th. When the density difference is not greater than the predetermined threshold value Th, the program goes to step S36. When it is determined that the first piece and the second piece of parts data adjoin to each other and the second piece and the third piece of parts data adjoin to each other at step S36, the program goes to step S37 to recognize the image parts expressed by the three pieces of parts data as constituents of a blend figure. Namely, the image parts that fulfill all the four conditions of determination at steps S33 through S36 are recognized as the constituents of a blend figure, whereas the image parts that do not fulfill any one of the four conditions are not recognized as the constituents of a blend figure.

After the blend recognizing process, the program returns to step S31 to update the three consecutive pieces of parts data, that is, specifying the second and the third pieces among the three consecutive pieces of parts data extracted in the previous cycle as the new first and the second pieces and a subsequent piece of parts data as the new third piece, and repeats the processing of step S32 and the subsequent steps.

This processing routine effectively prevents the image parts that do not constitute a blend figure from being mistakenly recognized as the constituents of the blend figure.

(3) Upon condition that two consecutive image parts constituting a blend figure always have different densities, the criterion of determination at step S3 in the blend recognizing process routine of FIG. 4 can be changed to "whether the difference in density is not greater than the predetermined threshold value Th nor equal to zero." Like the blend recognizing process routine shown in the flowchart of FIG. 12, this criterion effectively prevents the image parts that do not constitute a blend figure from being mistakenly recognized as the constituents of the blend figure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for processing image data of the type which includes a plurality of objects located in a predetermined area, each of said objects including a plurality of pixels and having an external, closed contour, said method comprising the steps of:

identifying a group of adjoining objects which should be processed as a single combined object, each object of said group adjoining at least one other object of said group to form a respective pairs of objects, a difference between an image density of each of said objects of said respective pair being greater than zero but less than a predetermined value;

image processing said group as a single combined object;

wherein said act of identifying comprises the acts of:

generating a bit map of said predetermined area, said bit map comprising a grid of pixels, each of said objects corresponding to a respective plurality of said pixels, each pixel of said bit map which corresponds to one or more of said objects being assigned a value associated with a respective one of its corresponding objects; and identifying one or more pairs of adjoining objects as being part of said group by examining said values of said pixels in said bit map to determining which objects adjoin one another.

2. A method according to claim 1, wherein said act of image processing includes modifying said contours of said objects.

3. A method according to claim 2, wherein at least one of said plurality of objects which is not part of said group adjoins or overlaps said group and wherein said image processing is a trapping operation carried out between said at least one object and said group of objects.

4. A method according to claim 3, wherein said trapping operation treats the individual objects of said group as a single object for the purpose of determining the shape of a trap formed during said trapping operation.

5. A method according to claim 4, wherein said trapping operation treats individual objects of said group of objects as separate objects for the purpose of determining the color and density of respective segments of said trap.

6. A method according to claim 5, wherein said trap is formed along a boundary between said at least one object and said group of objects.

7. A method according to claim 2 wherein said act of identifying comprises the act of:

examining the relative image density of said adjoining objects.

8. A method according to claim 7, wherein said values of all of said pixels are examined.

9. A method according to claim 8, wherein objects are determined to adjoin one another whenever said adjacent pixels have a different value.

10. A method according to claim 7, wherein objects are determined to abut or overlap one another whenever said adjacent pixels have a different value.

11. A method according to claim 7, wherein when two or more of said objects overlap to define an area of overlap, said act of generating assigns a value to each pixel in said area of overlap according to an assigned hierarchy of said overlapping objects.

12. A method according to claim 11, wherein said assigned hierarchy is a function of which of said overlapping objects is the topmost object.

13. A method according to claim 12, wherein said hierarchy is assigned by a human operator.

14. A method according to claim 12, wherein each object is assigned a unique value indicative of its hierarchy and said value assigned to each pixel in said area of overlap is said value of said topmost object of said overlapping objects.

15. A method according to claim 7, further including the act of selecting a desired resolution of said pixels.

16. A method according to claim 15, wherein said act of selecting a desired resolution of said pixels is carried out by a human operator.

17. A method according to claim 7, wherein said act of generating includes an act of successively writing respective object bit maps of each of said objects into a bit map memory, each object bit map being made up of a plurality of pixels, all of said pixels of a respective object bit map being assigned a single value which is different than the values assigned to said pixels of the remaining said object bit maps, said object bit maps being read into said bit map memory in accordance with said assigned hierarchy, each of said pixels of a respective object bit map being placed in a respective memory location of said bit map memory which corresponds to the position of that pixel in said predetermined area, each time a new value is placed in a respective memory location it replaces any prior value stored in that location.

18. A method according to claim 17, wherein each of said object bit maps are generated and stored in one or more temporary memories before they are stored in said bit map memory.

19. A method according to claim 17, wherein said act of determining comprises the step of examining values of said pixels in said bit map memory.

20. A method according to claim 19, wherein said values of all of said pixels are examined during said determining step.

21. A method according to claim 20, wherein objects are determined to adjoin one another whenever said adjacent pixels have a different value.

22. A method according to claim 19, wherein objects are determined to adjoin one another whenever said adjacent pixels have a different value.

23. Apparatus for processing image data of the type which includes a plurality of objects located in a predetermined area, each of said objects including a plurality of pixels and having an external, closed contour, said apparatus comprising:

means for identifying a group of adjoining objects which should be processes as a single combined object, each object of said group adjoining at least one other object of said group to form respective pairs of objects, a difference between an image density of each of said objects of said pair being greater than zero but less than a predetermined value;

an image processor which processes said group as a single combined object; and wherein said means for identifying:

generates a bit map of said predetermined area, said bit map comprising a grid of pixels, each of said objects corresponding to a respective plurality of said pixels, each pixel of said bit map which corresponds to one or more of said objects being assigned a value associated with a respective one of said objects;

identifies one or more pairs of adjoining objects as being part of said group by examining said values of said pixels in said bit map to determine which objects adjoin one another.

24. An apparatus according to claim 23, wherein said step of processing includes modifying said contours of said objects.

25. Apparatus according to claim 24, wherein at least one of said plurality of objects which is not part of said group adjoins or overlaps said group and wherein said image processor carries out a trapping operation between said at least one object and said group of objects.

26. Apparatus according to claim 25, wherein said trapping operation carried out by said image processor treats the individual objects of said group as a single object for the purpose of determining the shape of a trap formed during said trapping operation.

27. Apparatus according to claim 26, wherein said trapping operation carried out by said image processor treats individual objects of said group of objects as separate objects for the purpose of determining the color and density of respective segments of said trap.

28. Apparatus according to claim 27, wherein said trap is formed along a boundary between said at least one object and said group of objects.

29. Apparatus according to claim 24, wherein said means for identifying includes:

examining the relative image density of said adjoining objects.

30. Apparatus according to claim 29, wherein said means for identifying examines said values of all of said pixels.

31. Apparatus according to claim 30, wherein objects are determined to adjoin one another whenever said adjacent pixels have a different value.

32. Apparatus according to claim 29, wherein objects are determined to abut or overlap one another whenever said adjacent pixels have a different value.

33. Apparatus according to claim 29, wherein when two or more of said objects overlap to define an area of overlap, said means for identifying assigns a value to each pixel in said area of overlap according to an assigned hierarchy of said overlapping objects.

34. Apparatus according to claim 33, wherein said assigned hierarchy is a function of which of said overlapping objects is the topmost object.

35. Apparatus according to claim 34, further including means for enabling a human operator to select said assigned hierarchy.

36. Apparatus according to claim 28, further including means for enabling an operator to select a desired resolution of said pixels.

37. Apparatus according to claim 33, wherein said means for identifying generates said bit map of said predetermined area by:

successively writing each of said object bit maps into a bit map memory according to said assigned hierarchy, each of said pixels of a respective object bit map being placed in a respective memory location of said bit map memory which corresponds to the position of that pixel in said predetermined area, each time a new value is placed in a respective memory location it replaces said prior value stored in that location.

38. Apparatus according to claim 37, wherein said means for identifying determines that each object of said pair adjoins at least one other object in said group by examining values of said pixels in said bit map memory.

39. Apparatus according to claim 38, wherein said means for identifying examines said values of all of said pixels in said bit map memory.

40. Apparatus according to claim 39, wherein said means for identifying determines that objects adjoin one another whenever said adjacent pixels have a different value.

41. Apparatus according to claim 38, wherein said means for identifying determines that objects adjoin one another whenever said adjacent pixels have a different value.

42. A computer readable medium having a computer program stored thereon for determining an adjoining relationship between a plurality of objects located in a predetermined area, each of said objects including a plurality of pixels and having an external, closed contour; said computer program, when executed in a CPU, being adapted to carry out a method comprising the steps of:

identifying a group of adjoining objects which should be processes as a single combined object, each object of said group adjoining at least one other object of the group to form respective pairs of objects, a difference between an image density of each of said objects of said pair being greater than zero but less than a predetermined value;

image processing said group as a single combined object; and wherein said act of identifying comprises the acts of:

generating a bit map of said predetermined area, said bit map comprising a grid of pixels, each of said objects corresponding to a respective plurality of said pixels, each pixel of said bit map which corresponds to one or more of said objects being assigned a value associated with a respective one of its corresponding objects; and identifying one or more pairs of adjoining objects as being part of said group by examining said values of said pixels in said bit map to determining which objects adjoin one another.

43. A computer readable medium according to claim 42, wherein said act of image processing includes modifying said contours of said objects.

44. A computer readable medium according to claim 43, wherein at least one of said objects located in said predetermined area is not part of said group but is adjacent to or overlaps said group and wherein said image processing is a trapping operation carried out between said at least one of said objects and said group of objects.

45. A computer readable medium according to claim 44, wherein said trapping operation treats the individual objects of said group as a single object for the purpose of determining the shape of a trap formed during said trapping operation.

46. A computer readable medium according to claim 45, wherein said trapping operation treats individual objects of said group of objects as separate objects for the purpose of determining the color and density of respective segments of said trap.

47. A computer readable medium according to claim 46, wherein said trap is formed along a boundary between said at least one of said objects and said group of objects.

48. A computer readable medium according to claim 43, wherein said act of identifying comprises the act of:

examining the relative image density of said adjoining objects.

49. A computer readable medium according to claim 48, wherein all of said values of all of said pixels are examined during said determining step.

50. A computer readable medium according to claim 49, wherein objects are determined to adjoin one another whenever said adjacent pixels have a different value.

51. A computer readable medium according to claim 48, wherein objects are determined to adjoin one another whenever said adjacent pixels have a different value.

52. A computer readable medium according to claim 48, wherein when objects in said predetermined area overlap, said generating step assigns a value to each pixel in said overlapping area of said objects according to an assigned hierarchy of said overlapping objects.

53. A computer readable medium according to claim 52, wherein said predetermined hierarchy is assigned as a function of which of said overlapping objects is the topmost object.

54. A computer readable medium according to claim 53, wherein said program is designed to permit said hierarchy to be assigned by a human operator.

55. A computer readable medium according to claim 54, wherein said computer program is designed to permit the resolution of said pixels to be selected by a human operator.

56. A computer readable medium according to claim 48, wherein said generating step includes the steps of:

creating a respective object bit map for each of said objects, each object bit map being made up of a plurality of pixels, all of said pixels of a respective object bit map being assigned a single value which is different than said value assigned to said pixels of the remaining object bit maps;

successively writing each of said object bit maps into a bit map memory according to said assigned hierarchy, each of said pixels of a respective object bit map being placed in a respective memory location of said bit map memory which corresponds to the position of that pixel in said predetermined area, each time a new value is placed in a respective pixel memory location it replaces said prior value stored in that location.

57. A computer readable medium according to claim 56, wherein said act of determining comprises the step of examining values of said pixels in said bit map memory.

58. A readable medium according to claim 57, wherein said values of all of said pixels are examined during said determining step.

59. A computer readable medium according to claim 58, wherein objects are determined to adjoin one another whenever said adjacent pixels have a different value.

60. A computer readable medium according to claim 57, wherein objects are determined to adjoin one another whenever said adjacent pixels have a different value.

* * * * *